United States Patent

[11] 3,615,359

[72] Inventor Charles Toth
Westwego, La.
[21] Appl. No. 692,036
[22] Filed Dec. 20, 1967
[45] Patented Oct. 26, 1971
[73] Assignee Applied Aluminum Research Corporation
Westwego, La.

[54] PROCESS FOR PRODUCING ALUMINUM
15 Claims, 1 Drawing Fig.
[52] U.S. Cl. .................................................. 75/68 R,
75/80, 75/68 B, 23/8.7 R, 23/93
[51] Int. Cl. .......................................................... C22b 21/02,
C22b 47/00, C01 9 45/06
[50] Field of Search ........................................... 75/68, 68
A, 68 B, 80; 23/87, 93, 94

[56] References Cited
UNITED STATES PATENTS
2,452,665 11/1948 Kroll et al. .................... 75/63
1,232,169 7/1917 Ashcroft ....................... 23/87 X
1,321,281 11/1919 Burgess ........................ 23/93
2,048,987 7/1936 Atherholt ...................... 23/95
2,084,289 6/1937 McAfee ........................ 23/93 X
3,425,797 2/1969 Dewing ........................ 23/87

715,625 12/1902 Taddei ......................... 75/68
988,509 4/1911 Rockey et al. .............. 75/80
1,960,700 5/1934 Gann et al. .................. 75/80 X
2,184,705 12/1939 Willmore ..................... 75/68
2,607,675 8/1952 Gross ........................... 75/68 X
2,723,911 11/1955 Phillips et al. ............... 75/68
2,956,862 10/1960 Schott et al. ................. 75/80 X
3,078,154 2/1963 Hollingshead et al. ....... 75/68 X
3,137,567 6/1964 McGeer ....................... 75/68 X FOREIGN PATENTS
462,076 12/1949 Canada ........................ 75/68

OTHER REFERENCES
Electromotive Series; Merck & Co.

Primary Examiner—Henry W. Tarring, II
Attorney—Lane, Aitken, Dunner and Ziems

ABSTRACT: A process for producing aluminum involving reacting alumina under reducing conditions in the presence of carbon with manganese chloride to form aluminum trichloride and manganese and reacting the latter at a temperature sufficient to reduce said aluminum trichloride to aluminum. A process for producing aluminum from aluminum trichloride involving the use of manganese as a reducing agent.

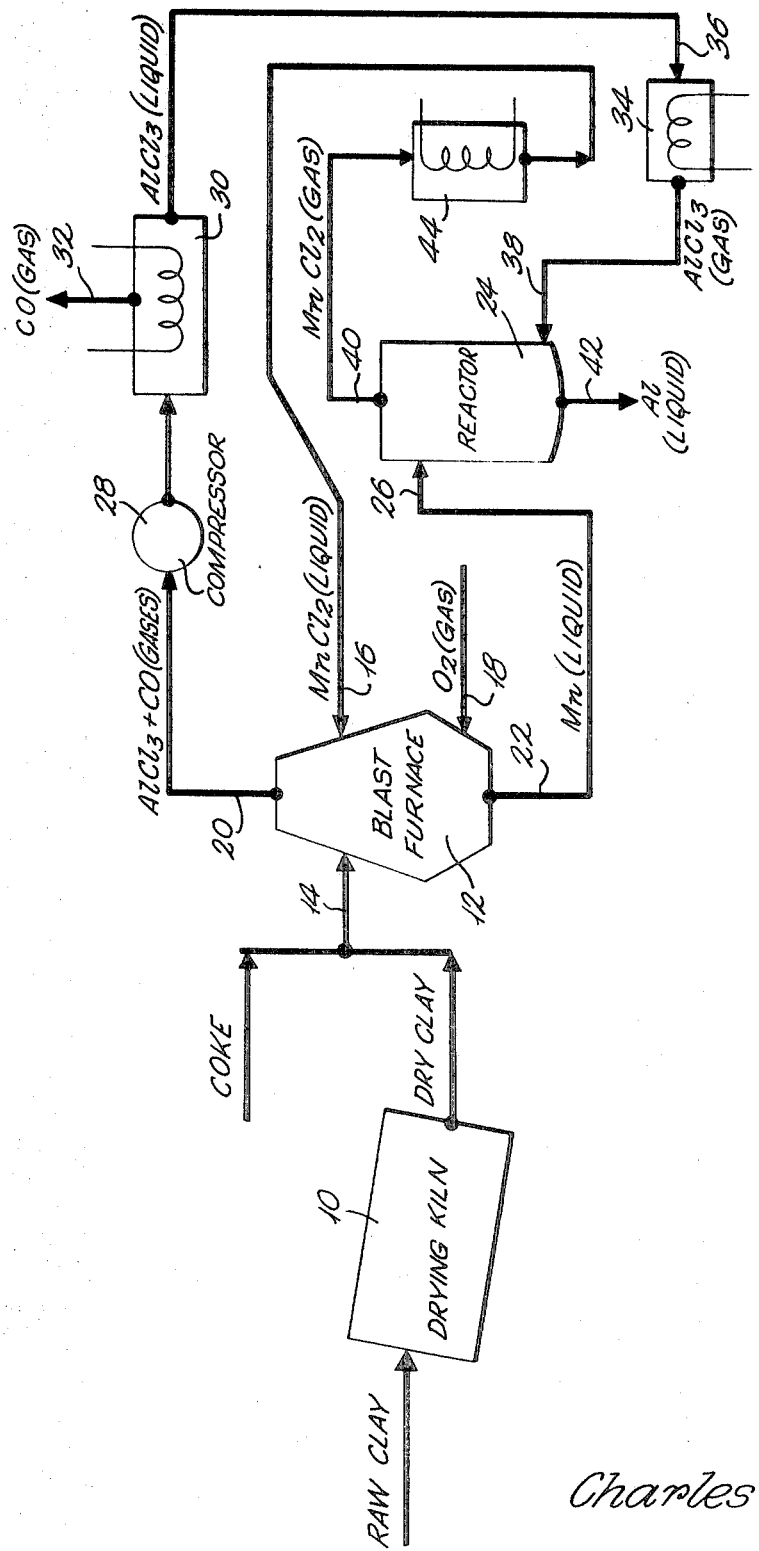

PROCESS FOR PRODUCING ALUMINUM

For a great many years, the universally employed process for manufacturing elemental aluminum has been the Bayer-Hall process. This process involves the mixing of bauxite with concentrated sodium hydroxide and the cooking of the mixture at a high temperature and pressure for several hours. The aluminum content of the bauxite dissolves during the cooking to form a pregnant liquor and the pregnant liquor is decanted from the mud, filtered, cooled and diluted. After long (at least 48 hours), continuous agitation of the diluted solution, approximately 50 percent of the aluminum content of the solution precipitates out as aluminum hydroxide. This aluminum hydroxide is then calcined at approximately 1200° C. and electrically reduced with the help of carbon electrodes and molten cryolite.

This process has a number of significant disadvantages In the first place, the bauxite employed must be extremely low in silica content (not greater than about 5% by weight) since the silica reacts with alumina and sodium hydroxide to form a sodium aluminosilicate in the form of a rocklike hard scale which tends to clog the equipment. Secondly, large alumina and sodium hydroxide losses result and a huge volume of liquid must be handled to produce a unit quantity of aluminum. Furthermore, the Bayer-Hall process has an extremely high energy requirement not only because the diluted solutions employed must be concentrated by evaporation, but because of the extremely high electrical energy requirement.

Because of the foregoing disadvantages, a vast effort has been exerted in the aluminum industry in an attempt to find alternative methods for producing aluminum. This effort has produced a vast quantity of patents and other literature.

One process which was developed in the course of this effort involved the chlorination of clay in the presence of carbon at elevated temperatures, the purification of the anhydrous (though dirty) aluminum chloride and the electrical reduction of the aluminum chloride to elemental aluminum and free chlorine gas. While this process was felt at the time to have potentially commercial implications, it suffered from a number of significant disadvantages which preclude it from commercial acceptance. These advantages included the production of an extremely low-grade, dirty aluminum with only a slight decrease in cost since there was still an extremely high electric power requirement, In addition, the cost of iron removal from the aluminum chloride proved to be prohibitive.

The present invention is related to the abortive attempt last described above in that it involves in part the chlorination of an alumina-containing raw material. At this point, however, the present invention departs radically and completely from such prior art approach and all other prior art aluminum-manufacturing processes of which applicant is aware and provides for the first time in the history of the aluminum industry a commercially practicable approach to the production of high quality aluminum by nonelectrolytic means. More specifically, the present invention broadly involves a cyclic process employing a two-step sequence, the first step involving the reaction of alumina and reducing conditions in the presence of carbon with manganese chloride to form aluminum trichloride and manganese and the second step involving the reaction of said aluminum trichloride and manganese at a temperature sufficient to reduce the aluminum trichloride to aluminum, following which the manganese chloride produced in the latter step is recycled to the first step.

It is accordingly a principal object of the present invention to provide a novel nonelectrolytic method of producing aluminum.

It is another important object of the present invention to provide a two-step process for producing aluminum comprising the reaction of alumina under reducing conditions in the presence of carbon with manganese chloride to form aluminum trichloride and manganese and the subsequent reaction of said aluminum trichloride with manganese at a temperature sufficient to reduce said aluminum trichloride to aluminum, the manganese chloride resulting from the latter step being recycled to the first step.

It is still another important object to provide a novel process for producing aluminum from aluminum trichloride comprising reacting said aluminum trichloride with manganese at a temperature sufficient to reduce the aluminum trichloride to aluminum.

These and other important objects and advantages of the present invention will become more apparent in connection with the ensuing description, appended claims and the single sheet of drawing which illustrates a flow diagram covering the sequence of steps of the process of the present invention.

At the outset, the process of the present invention will be described in its most general aspects with relation to the flow diagram on the single sheet of drawing and, subsequently, details of the process will be supplied.

An appropriate alumina-containing material (illustrated in the drawing as raw clay) is dried in kiln 10. The dried clay is mixed with coke and charged into blast furnace 12 at 14. Manganese chloride is passed into furnace 12 at 16 and oxygen to support the reaction is injected into furnace 12 at 18. After the reaction in furnace 12 has been completed, aluminum trichloride and carbon monoxide are taken off as gases from furnace 12 at 20 while elemental manganese is removed as liquid at 22.

The liquid manganese is charged into reactor 24 at 26. The aluminum trichloride and carbon monoxide gaseous mixture is compressed at 28 and the aluminum trichloride condensed as a liquid or solid in condenser 30 while the carbon monoxide is removed as a gas at 32. The aluminum trichloride liquid or solid passes into a heater 34 at 36 where it is converted to a gas which passes into reactor 24 at 38.

The aluminum trichloride gas is bubbled up through the liquid manganese in reactor 24 under appropriate reducing conditions to convert as much of the aluminum trichloride as possible to elemental aluminum. By carrying out the reduction reaction in reactor 24 at an appropriately high temperature, manganese chloride may be removed as a gas at 40 and aluminum as a liquid at 42. The manganese chloride is then condensed in condenser 44 and recycled as a liquid feed at the desired temperature to furnace 12 at 16.

While the alumina-containing material illustrated in the drawing is designated as raw clay, any alumina-containing material may be employed in the process though aluminosilicates in general and raw clay, shale or bauxite in particular are preferred. (The alumina-containing material will be hereafter described as clay.)

Since it is undesirable to have any significant quantity of moisture present in blast furnace 12, the clay is dried in kiln 10 to an appropriately low moisture content, preferably less than 0.1% of water by weight. The residence time and temperature employed in kiln 10 will necessarily vary depending upon the nature of the raw material used though ordinarily the material will be dried at a temperature of from about 200° to 1200° C. until the moisture content has reached the desired level. The clay is appropriately used in the form of pellets having a diameter of approximately one-half inch to 6 inches.

Before the clay is introduced into blast furnace 12, it is mixed substantially homogeneously with coke or other substantially hydrogen-free carbon-containing material (i.e. coal, charcoal, etc.) having approximately the same size. [When used in the specification and claims, "substantially hydrogen-free carbon-containing material" shall be construed to cover materials having no more than in the order of 5% by volume of hydrogen. The hydrogen content of the carbon-containing material is preferably no greater than about 1% by volume of the material] The coke not only serves as the essential energy source in furnace 12 but helps to reduce the alumina and the manganese compounds. THe mixture of clay and coke is introduced into blast furnace 12 so that it substantially fills up the latter.

Blast furnace 12 is constructed in a generally conventional manner for processes of this sort. Accordingly, the construction of furnace 12 forms no part of this invention and any conventional blast furnace which will withstand the conditions under which the reaction taking place in furnace 12 is performed would be appropriate.

The gross reaction which takes place in furnace 12 is as follows:

$$Al_2O_3 + 3MnCl_2 + 3C \rightarrow 3Mn + 2AlCl_3\uparrow + 3CO\uparrow$$

While the gross reaction which takes place may be thus illustrated, the reaction in fact involves a number of subreactions, some of them being listed as follows:

$$MnCl_2 + O_2 \rightleftharpoons MnO_2 + Cl_2\uparrow$$
$$2Al_2O_3 + 6Cl_2 \rightleftharpoons 4AlCl_3\uparrow + 3O_2\uparrow$$
$$2MnO_2 + 3C \rightarrow 2Mn + 2CO\uparrow + CO_2\uparrow$$
$$2C + O_2 \rightleftharpoons 2CO\uparrow$$
$$CO + O \rightleftharpoons CO_2\uparrow$$

In order to effect the conversion of the alumina to aluminum trichloride and the manganese chloride to elemental manganese as set forth in the equations above, the reaction is carried out in furnace 12 at a temperature ranging from approximately 190° C. at the top of the furnace to approximately 1400° C. at the bottom. The appropriate temperature is maintained by using a quantity of coke in stoichiometric excess over that needed to carry out the reactions in question, such excess ranging from approximately 5% to 50% by weight over that required. The oxygen may be preheated to about 200–1000° C. and preferably to about 900° C. and introduced as a pure gas in a quantity sufficient to supply the oxygen necessary for combustion and to maintain the required furnace reaction temperature as set forth above. Obviously this quantity will vary depending on the nature of the system and those skilled in the blast furnace art will have no difficulty selecting a proper oxygen flow rate for the particular problem at hand.

The manganese chloride may be introduced into furnace 12 in a stoichiometric quantity and in any form, viz, as a gas, liquid or solid. If it is introduced as a gas, it may be delivered to furnace 12 in the gaseous form from which it exits at 40 from reactor 24 though it is ordinarily more convenient to condense the manganese chloride leaving reactor 24 (as at 44) and to deliver the manganese chloride to reactor 12 as a liquid. The temperature of the manganese chloride at the time of its introduction into furnace 12 is about 650° to 1190° C.

The quantity of clay introduced into furnace 12 should be slightly in excess over that stoichiometrically necessary to enter into the above-identified reactions so as to permit appropriate slag formation in the furnace. An acceptable quantity of clay is enough to provide at least about a 15% by weight stoichiometric excess over the amount of alumina required to enter into the desired reactions.

It is desirable in carrying out the reaction in furnace 12 to keep both hydrogen and water out of the system. Hydrogen would tend to combine with oxygen in the furnace to form water which would combine with the aluminum trichloride to form alumina and hydrochloric acid. The latter is a highly undesirable material to have in the system. The presence of water would, of course, achieve the same undesirable result.

Furnace 12 is operated on a continuous basis with the coke-clay mixture, manganese chloride and oxygen being added periodically as required. At spaced intervals and as the quantity of elemental manganese reaches tappable quantities, molten manganese is tapped from the base of the furnace and charged into reactor 24 at 38 as aforesaid.

The aluminum trichloride and carbon monoxide gases leaving reactor 12 are separated by means of compression and condensation. The application of approximately 20 –150 p.s.i.g. (in compressor 28) to the gaseous mixture will permit the separation of the aluminum trichloride as a liquid in condenser 30 with the carbon monoxide being removed as a gas at that point. For best results the mixture in condenser 30 should be cooled only to that temperature at which it liquifies If desired, the aluminum trichloride may be cooled further to form a solid but this is not economical for subsequent handling and it is accordingly preferable to cool it only sufficiently to convert it to liquid form.

Since it is desirable that the aluminum trichloride have intimate contact with the liquid manganese in reactor 24, the liquid aluminum trichloride is preheated and evaporated at 34 to a temperature of at least about 900°–1300° C. following which the aluminum trichloride gas is bubbled up through the liquid manganese in reactor 24 as illustrated in the drawing. THe weight ratio of aluminum trichloride to manganese charged into reactor 24 will be about 1.65 to 1.

In the preferred embodiment of the invention, the molten manganese tapped from furnace 12 and charged into reactor 24 will consist substantially completely of elemental manganese with less than 10% impurities. As will be apparent, the process would still be operable, though less commercially feasible, if the manganese charged into reactor 24 were only part of the manganese-containing mass employed to react with the aluminum trichloride. Since the prime function of the reaction taking place in reactor 24 is to convert aluminum trichloride into elemental aluminum and not merely to chlorinate the manganese, there is a practical lower limit of the amount of manganese contained in such mass. Such lower limit is 5% and preferably 50% by weight of manganese.

[When used in the specification and claims, the phrase "-greater than minor amounts" of a substance shall be construed to mean at least about 5% by weight of said substance in the material in which said substance is present.]

The gross reaction which takes place in reactor 24 may be generally illustrated as follows:

$$2AlCl_3 + 3Mn \rightarrow 2Al + 3MnCl_2\uparrow$$

As shown, the manganese chloride is driven off as a gas with the elemental aluminum being drawn off as a liquid. In order to achieve this result, it is desirable to operate reactor 24 at a temperature above about ° C. which is the approximate boiling point of manganese chloride. If this approach is used, it will ordinarily be preferable to condense the manganese chloride (as at 44) to a liquid and to recycle it to furnace 12. Alternatively, the reactor 24 could be operated at a temperature below about 1190° C. at a point at which manganese chloride will exist as a liquid. While the aluminum will also exist as a liquid at that temperature, since the manganese chloride is more dense than the liquid aluminum, it will settle to the bottom of the reactor and the aluminum could readily be decanted from it. As will be apparent, it is a much more convenient procedure to operate above 1190° C. so that the manganese chloride can be readily removed from the top of reactor 24 as a gas.

In the embodiment in which the manganese chloride is to leave reactor 24 as a gas, the upper limit on the reaction temperature in reactor 24 will, as a practical matter, be dictated by the economics of the operation, though it will not be above about 1900° C. since this is the boiling point of manganese. In the preferred embodiment of the present invention, the temperature of reactor 24 will be between about 1260° C. and about 1400° C., the former temperature being above the melting point of manganese chloride and above the melting point of aluminum (about 660° C.). While the reaction could be carried out with the manganese in solid granular form by bringing the aluminum trichloride in contact with the granules below about 1260° C., it will in any event be carried out at least above 900° C. (preferably above 100° C.), 900° C. being the temperature at which aluminum trichloride reduction begins.

The liquid aluminum removed from reactor 24 is a very good quality aluminum and may appropriately be cast into ingots for subsequent use.

Reactor 24 may be an oversized crucible or column which is resistant to the reaction conditions carried out therein, any appropriate refractory for this purpose being suitable. As will be apparent, the particular construction of the reactor 24 forms no part of the present invention. As will further be obvious, since column 24 is used under batch operation while furnace 12 is operated continuously, a number of reactors 24 will be employed for each furnace 12 depending upon the nature and size of the latter.

The reaction in reactor 24 should be carried out until the reaction between the manganese and the aluminum chloride ceases. This may readily be determined when the gaseous manganese chloride coming off from the top of the reactor 24 at 40 ceases to form a condensate and a heavy white dense cloud (which represents aluminum trichloride) appears in its place. The reaction may then be stopped and the materials removed from reactor 24.

The significant advantages of the foregoing process will be readily apparent. The manganese, which is used to reduce the aluminum trichloride to form elemental aluminum, is converted in the process to manganese chloride which may then be readily recycled to the first stage of the reaction. At this point the chlorine content of the manganese chloride serves to form the desired aluminum trichloride for use in the second stage of the reaction, while simultaneously resulting in the production of elemental manganese which is used to reduce the aluminum trichloride in the second stage of the reaction. As a result, the efficiency of this process is extremely high and, since no costly electrical power is required as in the conventional Bayer-Hall process, the cost of production of high-grade aluminum is dramatically reduced in an extremely simple manner.

That the process of the present invention may be carried out in the manner indicated would not only have been difficult to predict but is inconsistent with all currently available knowledge of the mechanics of the types of reactions involved herein. More specifically, in order for the process of the present invention to be carried out the manganese must be capable of reducing aluminum trichloride to elemental aluminum while, at the same time, being capable of being reduced from its chloride form to its elemental form by carbon. Since those skilled in the art generally have assumed that in order for an element to reduce a compound containing a second element the former must be more electronegative than the latter one skilled in the art would ordinarily have concluded that manganese could not possibly reduce aluminum trichloride to elemental aluminum since it is more electropositive than aluminum. [The terms "electropositive" and "electronegative" are meant here to designate the position of an element relative to another element in the Periodic Table. Those elements which are in groups located to the right of a given element are electropostive; those elements which are in groups located to the left of such element are electronegative.] The fact of the matter is, however, that manganese does perform the function in question and reduces aluminum trichloride and, because of its low cost and ready availability, coupled with the capacity of its chloride to be reduced by carbon, provides an ideal means to accomplish the results achieved by the present invention.

The mechanism by which the manganese serves to reduce the aluminum trichloride is felt by applicant to be as follows: At the temperatures employed in reactor 24, aluminum trichloride disassociates as follows:

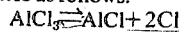

Since manganese forms a stable chlorine compound ($MnCl_2$) at the temperatures employed in reactor 24, it reacts with the free chlorine formed from the foregoing disassociation to push the equilibrium in the direction of the formation of AlCl. The AlCl is unstable at such temperatures and reacts with the manganese as follows:

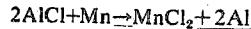

As will be apparent from the foregoing, the main advantage of the present invention resides in the provision of a complete two-stage process involving the recycling of the manganese chloride from the second stage to the first stage of the reaction. It will be noted, however, that the present invention simultaneously provides a subinvention in the use of manganese to reduce aluminum chloride to form elemental aluminum in an extremely effective manner. Thus, it is to be considered a subfeature of the present invention to provide for the production of aluminum through reduction of aluminum trichloride with manganese in the manner indicated. To carry out this subfeature of the invention, one could, if he was not concerned about a complete cyclic process which provides the maximum advantages of the present invention, use a preformed source of aluminum trichloride which could then be independently reacted with manganese under conditions such as are set forth in connection with reactor 24.

The following is a specific example of the process of the present invention:

Campeche white clay from Yucatan, Mexico, is charged into a rotary drying kiln which is 150 ft. long with an 8 ft. outer diameter at its exit end and a 5 ft. outer diameter at its inlet end. The clay raw material has the following chemical analysis on a dry basis in percent by weight:

| Ingredient | % By Weight |
|---|---|
| $Al_2O_3$ | 72.0 |
| $SiO_2$ | 20.0 |
| CaO | 3.0 |
| $Fe_2O_3$ | 2.0 |
| MgO | 2.0 |
| Miscellaneous materials ($MnO_2$; $TiO_2$; CuO; $V_2O_3$; etc.) | 1.0 |

This clay, in its as mined condition, has the following analysis in percent by weight:

| Ingredient | % By Weight |
|---|---|
| Inorganic Oxides | 72.0 |
| Free moisture | 20.0 |
| Water of crystallization and carbonates | 8.0 |

The operating temperature of the kiln is approximately 860° C. at the clay exit end and about 120° C. at the inlet end. The residence time of the clay in the kiln is approximately 4 hours so that the final moisture content (including both free moisture and water of crystallization) of the calcined clay is less than about 0.1% by weight.

The calcined clay is mixed homogeneously with coke in a ratio of about 1.4 parts by weight of coke to 1 part by weight of clay. The particle size of the clay at the time of its admixture with the coke is as follows:

| Diameter, inches | % By Weight |
|---|---|
| 2-4 | 80 |
| 1-2 | 10 |
| 0.5-1 | 5 |
| below 0.5 | 5 |

The coke which is employed is regular commercial high density coke with about 85% of the coke having a particle size between about 2 and 4 inches. The maximum hydrogen content of the coke is below about 0.01% by weight.

The coke is mixed homogeneously with the clay in a ratio of about 1.4 parts by weight of coke to 1 part by weight of clay and charged into the blast furnace to fill approximately 85-90 % of the volume of the furnace.

The blast furnace employed is the same as those presently used in the steel industry with the following minor modifications:

1. The size of the flue gas duct is about one-fifth greater than that of those used in steel industry blast furnaces so as to accommodate the extra volume of gas presented by the aluminum trichloride which is produced.
2. Provision is made for the injection of liquid manganese chloride at a point near the top of the furnace so as to effect reasonably good dispersal of the manganese chloride over the coke-clay mixture. This is accomplished by the use of a spray nozzle. The blast furnace is kept approximately 85-90% full at all times during its operation.

The oxygen injected into the blast furnace is substantially moisture and hydrogen-free, has a 90% minimum oxygen content by weight and is preheated to about 900° C. before introduction into the blast furnace. The oxygen is introduced into the blast furnace at a location approximately 4 ft. above the liquid manganese line at a flow rate of approximately 1.4 lbs. of oxygen per lb. of clay.

Manganese chloride is charged into the furnace at a temperature of about 1200° C. at a rate of approximately 1.15 parts by weight of manganese chloride per part by weight of clay.

The operation of the blast furnace is continuous and, in the manner in which conventional blast furnaces are operated, is periodically tapped to remove molten manganese from its base, with aluminum trichloride and other tail gasses exiting from the flue duct at its upper extremity. The furnace operates approximately in the order of 48 hours from the time a given mass of manganese chloride is injected into the furnace to the point at which the manganese in that mass is tapped from the furnace in molten form.

The tail gasses exiting from the furnace flue duct leave at about 190° C. and are produced in a quantity of approximately 90 ft.³/lb. of clay. The composition of such gas in percent by volume is approximately 7% aluminum trichloride, 70% carbon monoxide, 10% carbon dioxide, 10% nitrogen and 3% miscellaneous components. These tail gasses are compressed to about 80 p.s.i.g. and condensed to approximately 194° C. to liquefy the aluminum trichloride and permit separation therefrom of the rest of the gas components. Following such liquefication, the liquid aluminum trichloride is evaporated to a gas and preheated to approximately 1200° C.

The aluminum trichloride reduction reactor is charged with molten manganese from the blast furnace which leaves the blast furnace at about 1400° C. and is pumped into the reactor at a temperature of about 1340° C. The gaseous aluminum trichloride is bubbled up through this molten manganese in the reactor.

The aluminum trichloride reduction reactor is a 20 ft. high crucible appropriately lined with refractories and having an inside diameter of approximately 4 ft. The reactor is charged with approximately 120 ft.³ of molten manganese and the aluminum trichloride gas bubbled up through this molten manganese at a rate of approximately 3700 ft.³/min. at 80 p.s.i.g. and at an entry temperature of about 1200° C.

As the aluminum trichloride gas bubbles rise in the molten manganese, the aluminum trichloride reacts with the manganese and forms manganese chloride gas which leaves the reactor at its top. The aluminum trichloride gas is bubbled up through the liquid manganese in the reactor for approximately 8 hours at the foregoing flow rate. At the end of the 8 hour period, its flow rate if gradually reduced to zero flow rate within a period of 2 hours.

The effluent gas from the top of the reactor during the first 8 hours contains nearly 100% manganese chloride and has a temperature of slightly greater than 1200 ° C. At or near the end of the reaction when only trace amounts of manganese are present in the reactor, the effluent manganese chloride gas is very strongly diluted with aluminum monochloride and aluminum trichloride. (The latter is detected as a dense white cloud.) In order to avoid contamination of the manganese chloride with these latter gasses containing aluminum monochloride and aluminum trichloride, when the dense white cloud is detected the effluent gasses are diverted to the base of another reactor which still contains manganese and used as part of the aluminum trichloride charge material.

The large volume of manganese chloride gas (about 7.5 ft.³ of manganese chloride gas per ft.³ of aluminum trichloride) is then condensed to about 1200° C. to a significantly reduced volume and recycled to the blast furnace.

When the reaction is complete in the reactor, the liquid aluminum in the reactor is drained from the bottom of the reactor and formed into ingots for further use. The aluminum yield from the aluminum trichloride is about 98% by weight.

The process of the present invention provides a simple and economical means for the production of elemental aluminum. The need for large quantities of electrical power is completely eliminated by this process since the essential energy source is the coke or other carbonaceous material employed in furnace 12. In addition, the handling and energy requirements involved in the use of large volumes of liquid and other materials are substantially reduced. FUrthermore, processes such as the Bayer-Hall process inevitably result in the loss of all minor constituents in the raw materials which might otherwise be useful; the process of the present invention makes it economically possible to recover minor materials such as Fe, Ti, V, U, Co, etc. because of the large quantities processed. Still further, the process of the present invention eliminates the problems created by excess silica in the alumina-containing raw material since the chlorination of the clay is carried out at a sufficiently low temperature (below 1200 ° C.) that chlorination of the silica in negligible.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. A process for producing aluminum from gaseous aluminum trichloride comprising reacting said aluminum trichloride with manganese in a reaction zone at a temperature sufficient to reduce the aluminum trichloride to liquid aluminum in said reaction zone, said manganese being contained in a mass at least about 5% by weight of which is manganese at least at the time the aluminum trichloride first contacts said manganese at the beginning of said reaction, said reaction being carried out to provide a net increase in the quantity of said liquid aluminum produced from said reaction zone.

2. A process as defined in claim 1 wherein said manganese is contained in a mass at least about 50% by weight of which is manganese at least at the time the aluminum trichloride is first contacted with said manganese at the beginning of said reaction.

3. A process as defined in claim 1 wherein one of the reaction products is manganese chloride and additionally comprising maintaining said temperature below the boiling point but above the melting point of said manganese chloride so that the manganese chloride will form A liquid layer which is substantially immiscible with said aluminum; and separating said liquid layer of manganese chloride from said aluminum.

4. A process as defined in claim 1 wherein one of the reaction products is manganese chloride and additionally comprising maintaining said temperature above the boiling point of said manganese chloride; and removing said manganese chloride from said aluminum as a gas.

5. A process for producing aluminum from gaseous aluminum trichloride comprising reacting said aluminum trichloride with manganese in a reaction zone at a temperature sufficient to reduce the aluminum trichloride to produce liquid aluminum, said manganese being contained in a mass at least about 5% by weight of which is manganese at least at the time the aluminum trichloride first contacts said at the beginning of said reaction, said reaction being carried out to provide a net increase in the quantity of said liquid aluminum produced from said reaction zone.

6. A process for producing aluminum comprising: (a) reacting alumina manganese chloride under reducing conditions and in the presence of oxygen and a substantially hydrogen-free carbon-containing material so as to form aluminum trichloride and manganese; (b) reacting said aluminum trichloride with said manganese at a temperature sufficient to reduce said aluminum trichloride to aluminum; and (c) said reactions (a) and (b) taking place in separate zones.

7. A process as defined in claim 6 wherein manganese chloride is formed during the reduction of said aluminum trichloride and additionally comprising recycling said manganese chloride so formed for reaction with alumina in step (a).

8. A process as defined in claim 6 wherein manganese chloride is formed during the reduction of said aluminum trichloride and additionally comprising maintaining the temperature of said aluminum trichloride reduction reaction above the boiling point of said manganese chloride; and removing said manganese chloride from said aluminum as a gas.

9. A process as defined in claim 6 wherein manganese chloride is formed during the reduction of said aluminum trichloride and additionally comprising maintaining the temperature of said aluminum trichloride reduction reaction below the boiling point but above the melting point of said manganese chloride so that said manganese chloride will form a liquid layer which is substantially immiscible with said aluminum; and separating said liquid layer of manganese chloride from said aluminum.

10. A process as defined in claim 6 wherein said carbon-containing material is coke, coal or charcoal.

11. A process as defined in claim 6 wherein said alumina is in the form of an aluminosilicate.

12. A process as defined in claim 6 wherein the temperature of said aluminum chloride reduction reaction is above the melting point of manganese.

13. A process as defined in claim 6 wherein the temperature of said aluminum chloride reduction reaction is at least about 900° C.

14. A process as defined in claim 6 wherein said aluminum trichloride is reacted with said manganese in step (b) at a temperature sufficient to reduce the aluminum trichloride to liquid aluminum in the reaction zone in which the reaction of step (b) occurs.

15. A process for producing aluminum comprising:
   a. reacting alumina with manganese chloride under reducing conditions and in the presence of oxygen and coke, coal or charcoal so as to form aluminum trichloride and manganese; said reaction taking place in a first reaction zone the temperature of which is between about 190° C. and 1400° C.;
   b. passing said aluminum trichloride in gaseous form into intimate contact with said manganese in liquid form in a second reaction zone at a temperature above the melting point of manganese up to about 1400° C. so that manganese will react with said aluminum trichloride to reduce it to aluminum and to form manganese chloride in gaseous form;
   c. separating gaseous manganese chloride from said aluminum.

UNITED STATES PATENT OFFICE
CERTIFICATE OF CORRECTION

Patent No. 3,615,359                  Dated  October 26, 1971

Inventor(s) CHARLES TOTH

It is certified that error appears in the above-identified patent and that said Letters Patent are hereby corrected as shown below:

Column 1, line 39, "preclude" should read -- precluded -- ; line 40, "advantages" should read -- disadvantages -- ; line 56, "and", should read -- under -- . Column 4, line 32, insert -- 1190 -- between "about" and "°C."; line 60, "100°C." should read -- 1000°C. -- . Column 8, line 8, "FUrthermore" should read -- Furthermore -- ; line 18, "in" should read -- is -- ; line 48, "A" should read -- a -- ; line 64, insert -- manganese -- between "said" and "at"; line 69, insert -- with -- between "alumina" and "manganese".

Signed and sealed this 22nd day of January 1974.

(SEAL)
Attest:

EDWARD M. FLETCHER, JR.          RENE D. TEGTMEYER
Attesting Officer                 Acting Commissioner of Patents